Aug. 27, 1968  H. J. RUETENIK  3,398,706
SOIL STERILIZER APPARATUS
Filed Sept. 28, 1967
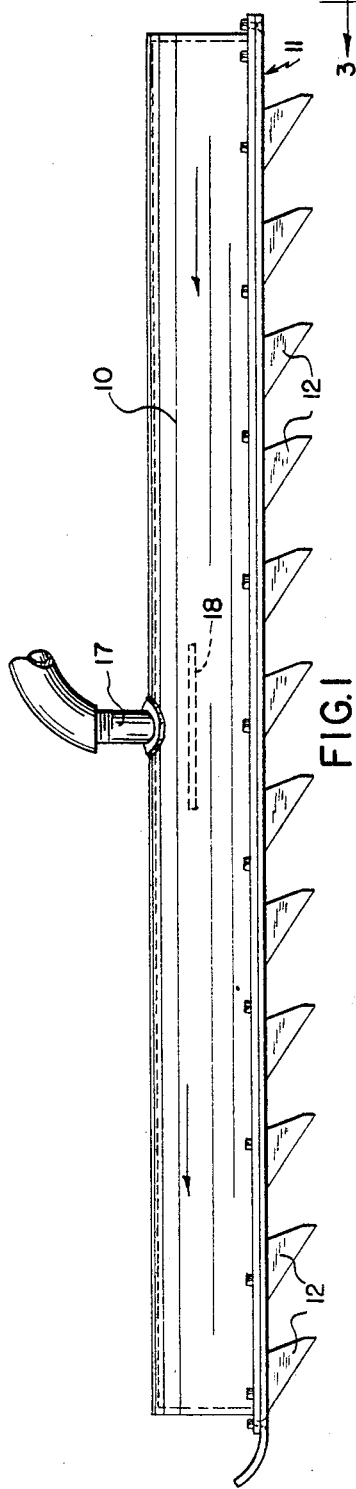
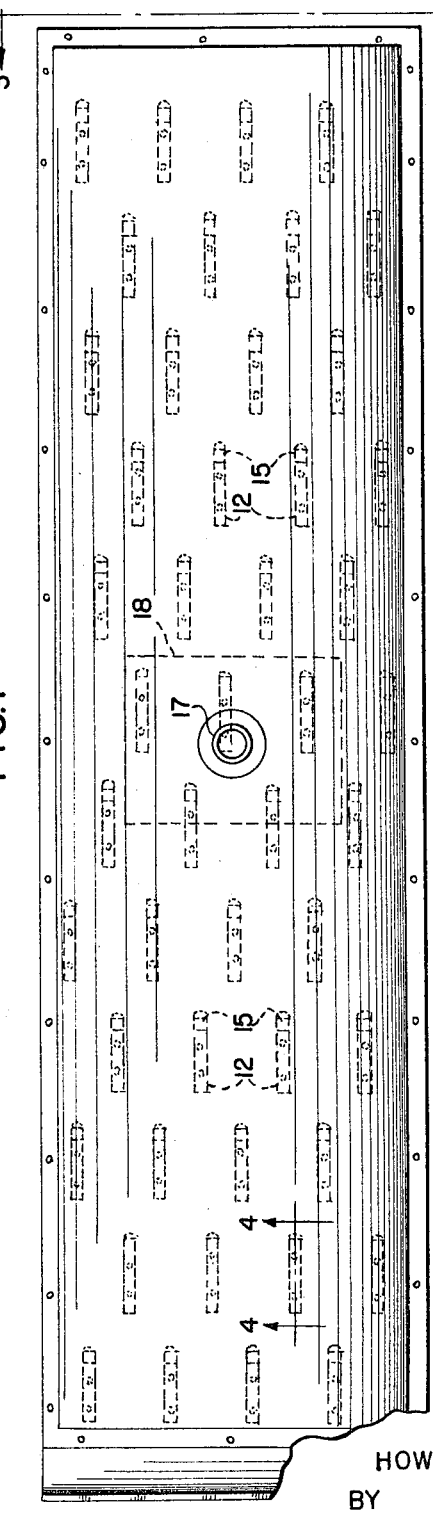
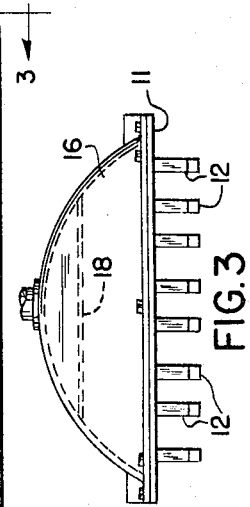
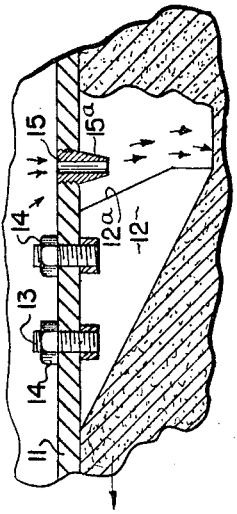
INVENTOR
HOWARD J. RUETENIK
BY
*Baldwin, Doran & Egan*
ATTORNEYS

3,398,706
SOIL STERILIZER APPARATUS
Howard J. Ruetenik, Box 5, Green Valley, Ariz. 85614
Continuation-in-part of application Ser. No. 556,375,
June 9, 1966. This application Sept. 28, 1967, Ser.
No. 671,392,
4 Claims. (Cl. 111—7)

ABSTRACT OF THE DISCLOSURE

A soil sterilizing device is provided with a flat plate adapted to slide in a path over the surface of the soil in contact with the soil over substantially the entire under surface of the plate. A plurality of furrowing blades are rigidly secured to the plate and extend downwardly therefrom into the soil. These blades are spaced laterally across the plate normal to the path of travel of the sterilizer in a plurality of lateral rows. These lateral rows are spaced longitudinally of the plate in the direction of the path of travel. Immediately behind each furrow blade is a jet forming means in the plate, together with means for supplying a stream of sterilizing material under pressure to this jet forming means at each blade location, the preferred sterilizing material being mentioned as steam. A preferred arrangement of the furrowing blades is to have those in each lateral row staggered laterally relative to the blades in the rows ahead of and behind it. This results in a large number of parallel furrows being treated by one passage of the sterilizer device so that the entire area is evenly treated with steam which is held trapped in the soil by the plate until the plate has passed entirely over the spot.

Specification

This application is a continuation-in-part of my copending application Ser. No. 556,375, filed June 9, 1966, now abandoned.

This invention relates to improvements in a soil sterilizer apparatus.

One of the objects of the present invention is to introduce a sterilizing jet stream into the upper layer of soil in a simple but efficient manner.

Another object of the present invention is to provide a soil sterilizer, wherein a furrowing member is adapted to be moved through the soil to be sterilized, and means is provided for passing a sterilizing jet into the soil space opened up by the furrowing member, and to hold the sterilizing material in the soil until the sterilizer has passed on.

Other objects and advantages of this invention will be apparent in the specification and drawings and the essential features will be set forth in the appended claims.

In the drawings,

FIG. 1 is a side elevational view of the soil sterilizer of this invention;

FIG. 2 is a top plan view of the sterilizer of FIG. 1 with a reservoir hood removed for clarity;

FIG. 3 is an end elevational view of the device of FIGS. 1 and 2; while

FIG. 4 is a fragmental sectional view, enlarged, taken along the line 4—4 of FIG. 2.

One of the uses of this invention is to destroy weed seed in the soil or at least to prevent it from germinating. It has been demonstrated that most weed seeds are killed at temperatures of 160° to 170° F. and, since most seed will only germinate in close proximity to the surface of the soil, it is only necessary to treat about the first one and a half inches of the soil at the top layer thereof.

This invention has been described in connection with the use of steam as a sterilizing jet, although those skilled in this art will understand that other sterilizing material might be used in the same jets.

The invention relates more to the apparatus for applying the jet to the soil rather than the specific nature of the jet itself.

In FIGS. 1 through 4, I have shown an embodiment of the invention including a hollow reservoir 10 having a flat bottom surface 11 adapted to slide over the surface of the soil. A plurality of furrowing members or blades 12 are rigidly secured to the reservoir member and project from the bottom thereof to extend into the soil preferably for a distance of one and one-half inches or such depth as the need dictates. In this embodiment, the furrowing members are individual blades of steel about 5/16" thick and a total length of 3 inches and projecting about 1½" at their depth of greatest penetration. This is for a small size device about fourteen inches wide and a little over four feet long but larger devices are used for treating the soil in an outside field. The invention is not limited to any particular size device. As best seen in FIG. 2, in this particular embodiment there are twelve rows of blades crosswise of the sterilizer spaced three inches apart in each lateral row and the lateral rows four inches apart longitudinally. It will be noted that every lateral row is staggered with respect to other lateral rows so that the furrowing members 12 will cut closely parallel paths through the soil. In FIG. 2 it will be noted that the longitudinal rows of blades are not parallel to the sides of bottom plate 10. Actually, of the three blades in the bottom row, each one is spaced ¼ inch farther from the near side of plate 11 than the preceding one. Then the left-hand blade in the second row is ¼ inch farther than the last or right-hand blade in row one. Then as you look to the right in row two each blade is ¼ inch farther up than the next preceding blade. The same pattern is followed in all nine longitudinal rows so that one passage of the sterilizer opens up parallel furrows spaced ¼ inch apart over the area traversed. It is obvious that the furrows opened up by one lateral row of blades is at least partially closed by earth displaced by blades in following lateral rows. Referring to FIG. 4, each blade 12 is shown as secured by threaded studs 13 and nuts 14 to the bottom plate 11 of the upper reservoir member.

Also, as noted in FIG. 4, means is provided to introduce the sterilizing jet into the soil space opened up by the furrowing members 12. In this embodiment, the rear end of the blade at 12a is inclined from its lower part upwardly and forwardly in the direction of the sterilizer path of movement. In this particular form, the inclined surface 12a begins about ½" above the lowest tip of the blade and is inclined forwardly about ½" in the upper one inch of the blade as clearly seen. Jet forming openings 15 are provided in the bottom plate 11 of the reservoir and in this specific form each one is a ¼" diameter hole fitted with a nozzle 15a having a bore which will usually be about ⅛" more or less and located above the inclined end 12a of the furrowing member. The nozzle 15a may be varied to fit the conditions. It results from this construction that as the furrowing member moves in the direction of the arrow of FIG. 4, the soil is temporarily opened up by passage of the blade 12 leaving sufficient opening for a jet stream discharging downwardly through the opening 15 or 15a and passing into the soil down to the lowest extent of the blade 12. There is one of these jet forming openings 15 in the same relative position with respect to each one of the furrowing members 12. This results in the entire area of soil traversed being subjected to jets of steam every ¼ inch apart laterally across the surface. The steam is held trapped in the soil by the plate until the plate has passed entirely over the area.

To supply the sterilizing jet to each of the jet openings 15, a hood 16 completely encloses the space above the plate 11 of the sterilizer member and is provided with an inlet 17 for the introduction of a stream of sterilizer material, such as steam, into the hood or reservoir 16. In this case, a baffle 18 serves to more evenly distribute the steam to various parts of the reservoir 16.

In using the device of this invention for killing or discouraging the germination of weed seeds, the sterilizer device is pulled toward the left as viewed in FIG. 1 by any suitable means while the sterilizer jets emerge from the openings 15a so as to thoroughly treat the soil as desired. The steam is preferably at a temperature to heat the soil between about 160° and about 170° F. although a higher temperature will do no harm.

This invention thus provides a simple method and apparatus for the shallow sterilization of soils. The flat bottom of plate 11 is tight upon the soil as the sterilizer passes over it so that steam injected from any of the nozzles 15a is held trapped in the soil until the plate 11 has passed entirely over that point. The blades are so staggered in the various lateral rows that each blade is followed (except as to the last row) by a blade in a following lateral row close enough to at least partially close the furrows opened by the blades in preceding rows so that the soil is impregnated with the steam in closely spaced parallel furrows which steam is held trapped in the soil by the plate 11.

What is claimed is:

1. A soil sterilizer comprising a flat plate adapted to slide in a path over the surface of the soil in contact therewith over substantially the entire under surface of said plate, a plurality of furrowing blades rigidly secured to said plate and extending downwardly therefrom, said blades spaced laterally across said plate normal to said path in a plurality of lateral rows, said rows spaced longitudinally of said plate in the direction of said path, jet forming means supported by said plate immediately behind each of said blades, and means for supplying a stream of sterilizing material under pressure to said jet forming means, whereby, as said flat plate is moved over the soil and along said path, closely spaced furrows in said soil are treated with sterilizing material which is held trapped in said soil by said plate until said plate has passed entirely over said spot.

2. A soil sterilizer as defined in claim 1 wherein said blades in every lateral row are staggered laterally relative to the blades in other rows.

3. A soil sterilizer as defined in claim 1 wherein said blades in each lateral row are staggered laterally relative to the blades in the lateral rows ahead of and behind it with such lateral spacing that the blades in one lateral row force soil into the furrows formed by the blades in a preceding lateral row.

4. A soil sterilizer as defined in claim 3 wherein said stream of sterilizing material is steam.

References Cited

UNITED STATES PATENTS

| | | | |
|---|---|---|---|
| 992,140 | 5/1911 | Anderberg et al. | 111—6 |
| 1,021,530 | 3/1912 | Johnson | 111—6 X |
| 1,093,786 | 4/1914 | Korthauer | 111—7 |
| 2,515,317 | 7/1950 | Schindler | 111—7 |
| 2,625,123 | 1/1953 | Morgan | 111—7.1 |

FOREIGN PATENTS

| | | |
|---|---|---|
| 911,780 | 4/1946 | France. |
| 825,775 | 12/1951 | Germany. |

ROBERT E. BAGWILL, *Primary Examiner.*